United States Patent
Bird et al.

[15] 3,703,672
[45] Nov. 21, 1972

[54] THREE-PHASE INDUCTION-MOTOR, SPEED-CHANGING METHOD AND CONTROL CIRCUIT

[72] Inventors: Brian Michael Bird; Gordon Hindle Rawcliffe, both of Bristol, England

[73] Assignee: National Research Development Corporation

[22] Filed: April 26, 1971

[21] Appl. No.: 137,533

[30] Foreign Application Priority Data

May 5, 1970 Great Britain..........21,653/70

[52] U.S. Cl. ....................318/227, 318/230, 318/231
[51] Int. Cl. ..............................................H02p 5/40
[58] Field of Search...............318/138, 227, 230, 231

[56] References Cited

UNITED STATES PATENTS

| | | |
|---|---|---|
| 3,387,195 | 6/1968 | Piccand et al. ............318/227 |
| 3,247,432 | 4/1966 | Robinson...............318/138 X |
| 3,364,414 | 1/1968 | Paulus ..................318/231 X |
| 3,493,838 | 2/1970 | Gyugyi et al...........318/227 X |
| 3,536,970 | 10/1970 | Costa et al..................318/227 |
| 3,611,087 | 10/1971 | Shtein......................318/231 |

*Primary Examiner*—Gene Z. Rubinson
*Attorney*—Larson, Taylor & Hinds

[57] ABSTRACT

A method of changing the speed of a three-phase induction motor by deriving from the A.C. supply a modulating wave of sub-multiple frequency, deriving therefrom a corresponding rectangular wave, modulating each phase of the supply by three such modulating waves, with the same sequence or opposite sequence to the supply phases. Modulation of the supply is effected by gating thyristors from the modulating waves. By varying the modulation frequency, the motor speed is varied stepwise over a speed range.

16 Claims, 8 Drawing Figures

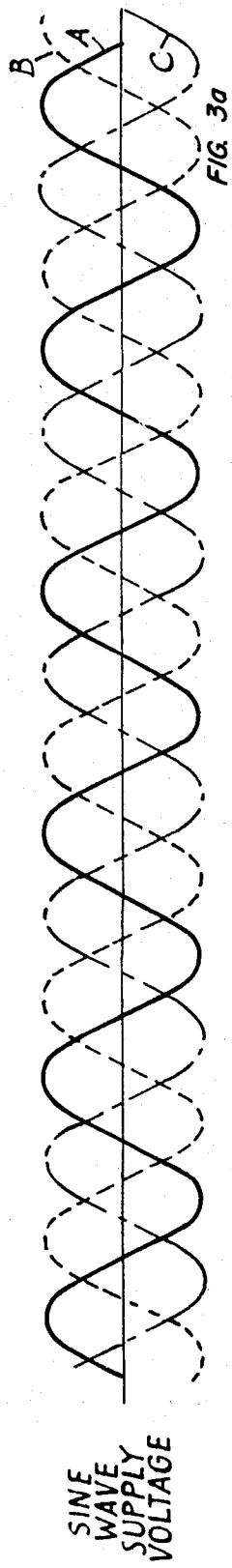
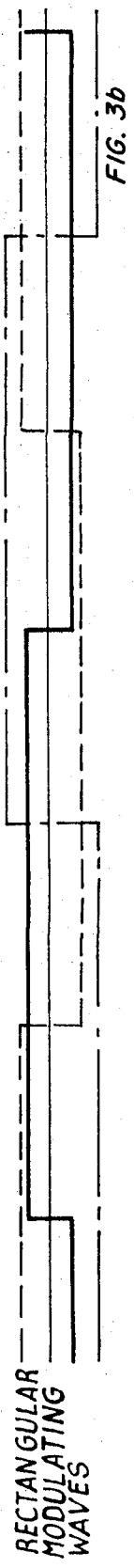
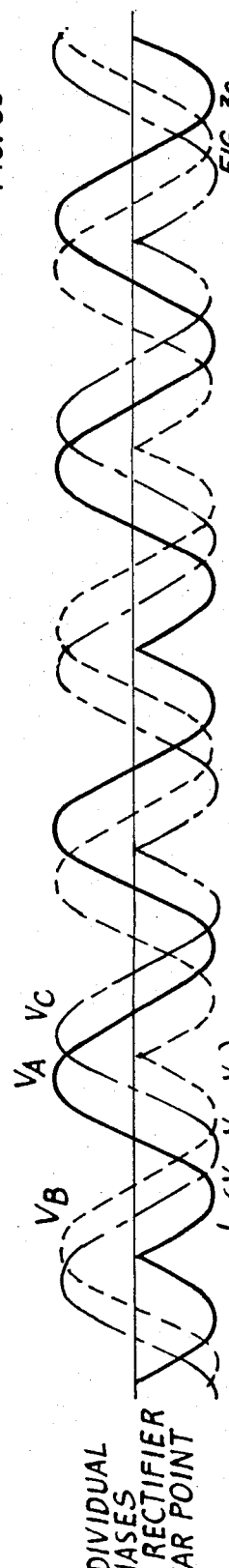
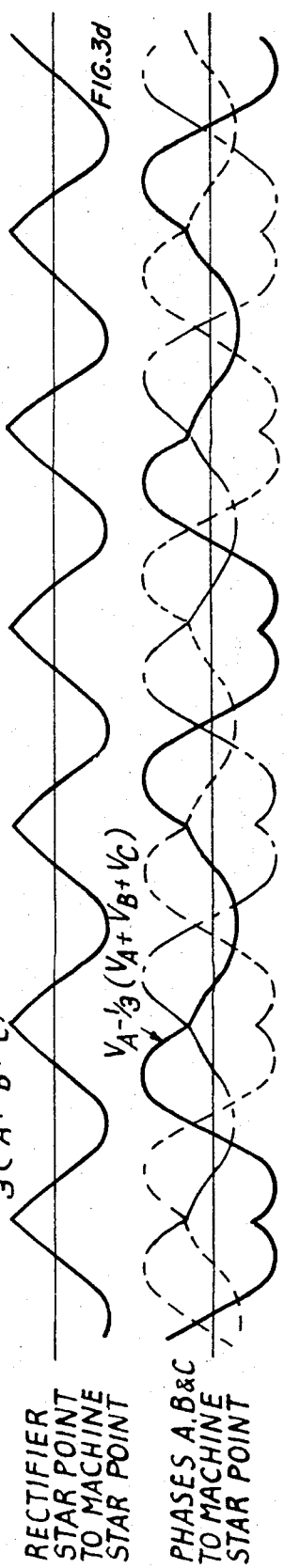
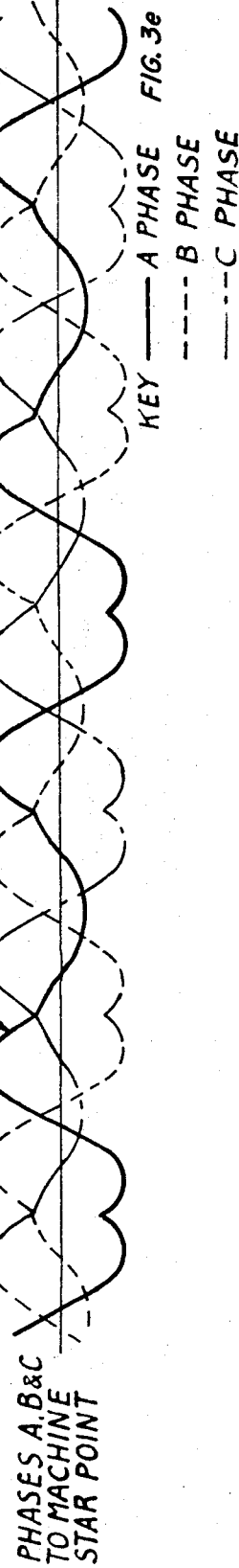

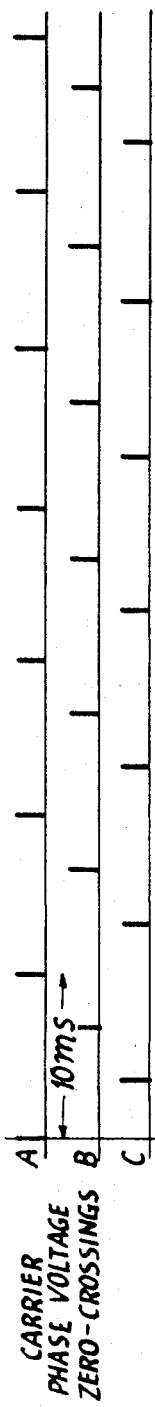
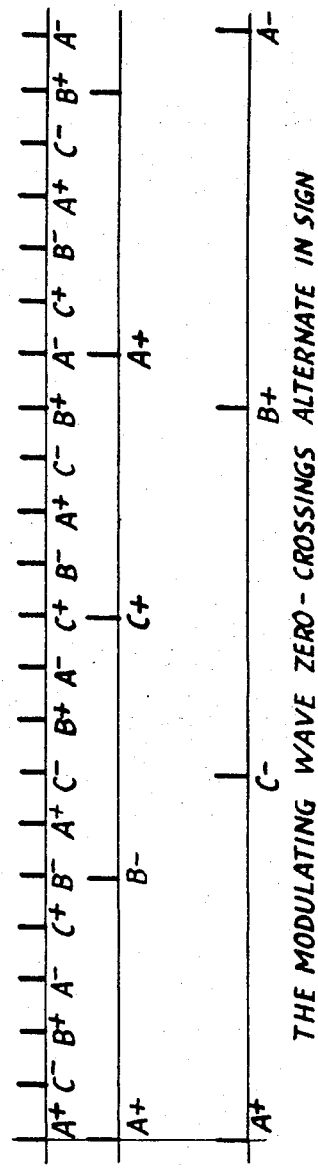

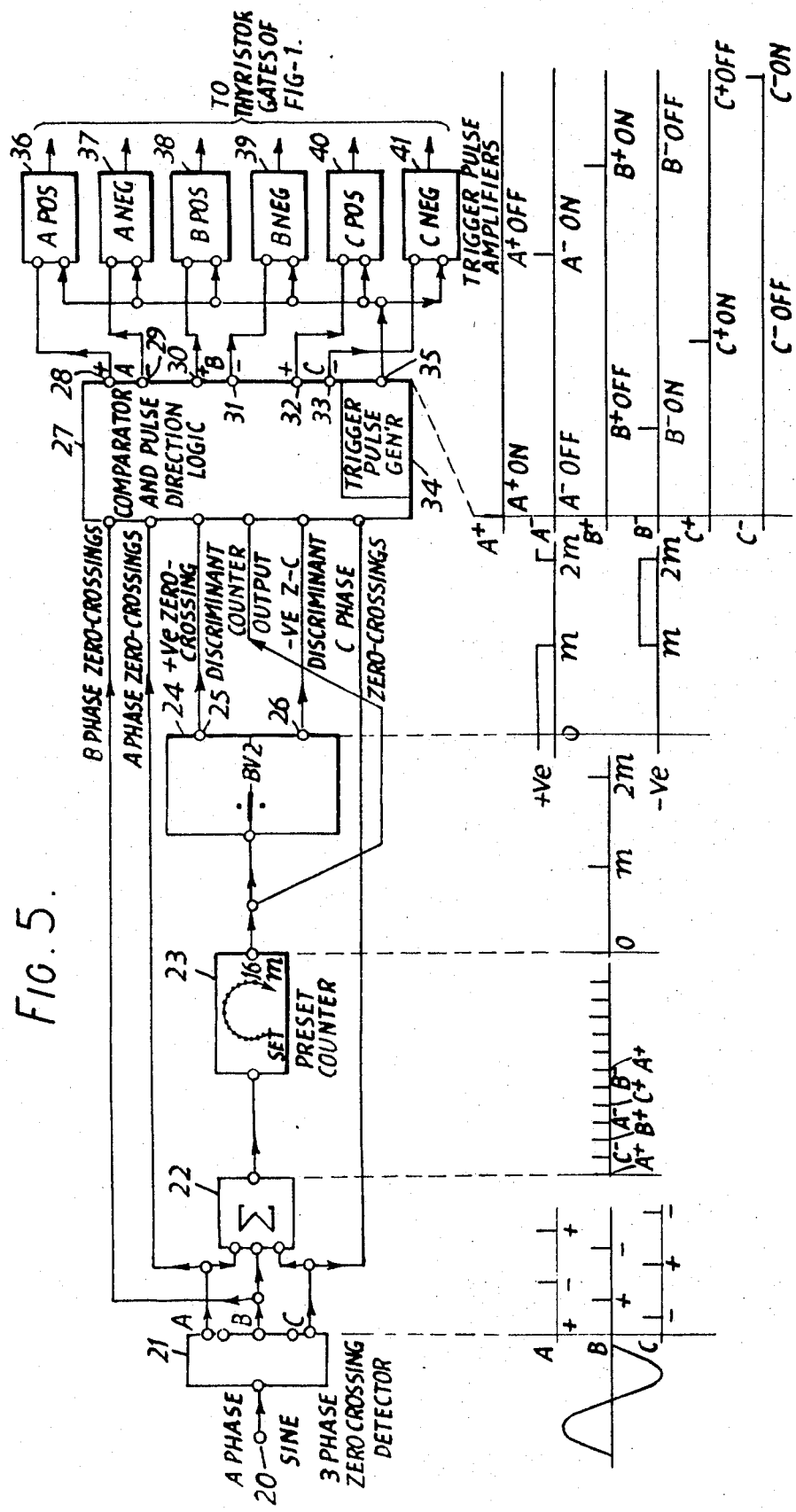

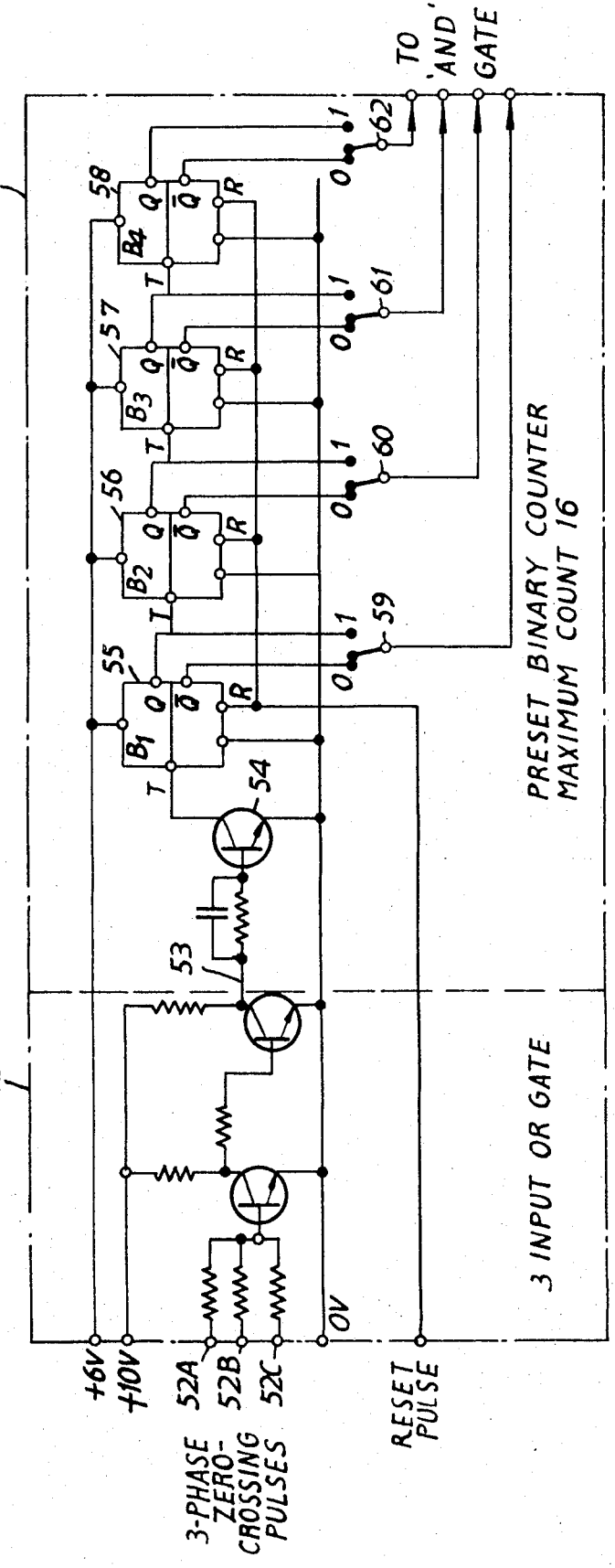

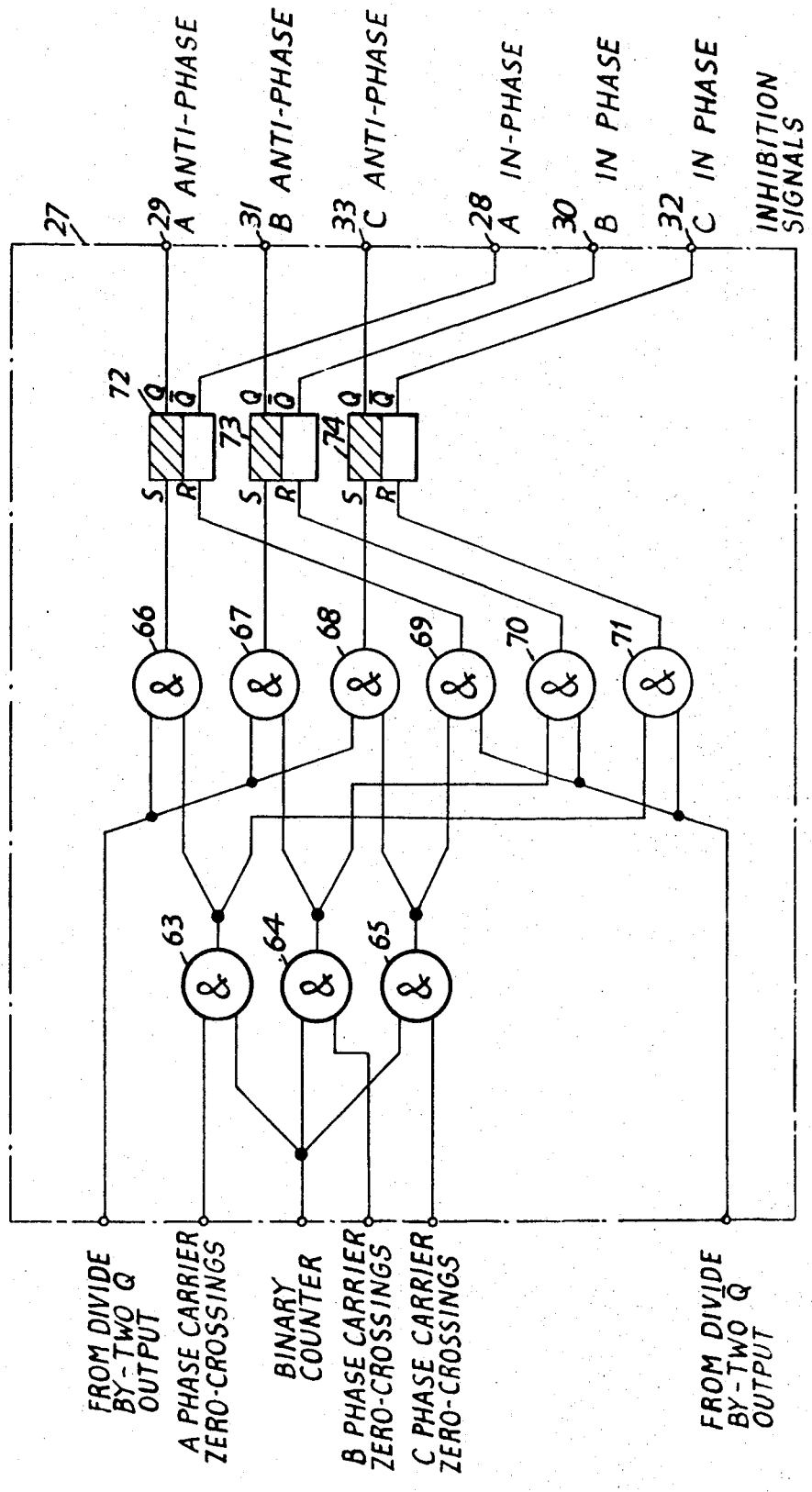

THREE-PHASE INDUCTION-MOTOR, SPEED-CHANGING METHOD AND CONTROL CIRCUIT

This invention relates to speed-changing, three-phase alternating current induction motors and to associated circuit arrangements for effecting speed-changing.

The object of the invention is to provide an improved method of speed-changing for three-phase alternating current induction motors and to provide improved control circuit arrangements for effecting speed changing using the said improved method.

In the field of radio-frequency engineering, it is well-known that if a high-frequency, alternating-current wave (a carrier wave) of frequency C is amplitude modulated in time by a low-frequency wave (a modulation wave) of frequency M, two new waves are generated (the so-called side-bands) of frequency (C+M) and (C−M). Examination of the mathematical expressions involved shows that this phenomenon is not limited to a high-frequency wave, that is a radio-frequency wave, modulated by a low-frequency wave. Nor, in fact, is the phenomenon limited to amplitude modulation in time.

Amplitude modulation in space (not in time) of a multiple pole magnetomotive force wave is now well-known for providing speed-changing rotary electric machines. U.S. Pat. No. 3,233,159 describes the method of pole-amplitude-modulation which is amplitude-modulation in space of the M.M.F. waveform of a three-phase motor together with the elimination of one of the two modulated pole-numbers, for changing the operating pole-number of an alternating-current machine. The mathematical theory is set out in the body of that specification.

However, the principle of amplitude modulation in time has not previously been used in relation to alternating current, rotary electric machines. The present invention employs this principle of amplitude modulation in time, together with the suppression of one of the "side-band" frequencies thereby generated, to effectively change the frequency of the alternating current supply to a machine, so that the speed of the machine is changed correspondingly.

The mathematical theory of the present invention is set out in the present specification. The similarity of the mathematical expressions for the modulation products by the two methods, pole-amplitude modulation and current amplitude modulation, will be noted. At the same time, the essential difference between the known method of pole-amplitude modulation in space and current amplitude modulation in time according to the present invention, will be understood.

Mathematical Theory

The equations which relate to current amplitude modulation can be derived as follows:

The 3-phase balanced sine wave supply can be represented in the usual way as:

Phase A = $I \sin \omega t$
Phase B = $I \sin (\omega t - 2\pi/3)$
Phase C = $I \sin (\omega t - 4\pi/3)$ The current modulation waves to be applied in time respectively to the three phases are given by:

Phase A — $\sin [\omega t/m]$
Phase B — $\sin [\omega t/m \pm 2\pi/3]$
phase C — $\sin [\omega t/m \pm 4\pi/3]$ for 100 percent modulation. The alternative signs (±) correspond to modulation sequences which are respectively opposed to, or the same as, the phase sequence of the supply voltage. The two cases will be considered separately, below.

The displacements of $(2\pi/3)$ for the three current modulating waves are measured on the scale of the modulating wave. On the scale of the supply frequency, these displacements are $$(\pm 2m\pi/3)$$

and $$(\pm 4m\pi/3)$$

Consider, first, the case when the phase angle between the supply and modulating waves is positive.
In this case, the phase currents are given by:

Phase A = $I \sin \omega t [\sin (\omega t/m)]] = I/2 ( \cos [\omega t (1 - 1/m)] - [\cos \omega t (1 + 1/m)] )$ Phase B = $I \sin (\omega t - 2\pi/3) [\sin (\omega t/m + 2\pi/3)] = I/2 ( \cos[\omega t (1 - 1/m) - 4\pi/3 ] - \cos[\omega t (1 + 1/m)] )$ Phase C = $I \sin (\omega t - 4\pi/3) [\sin (\omega t/m + 4\pi/3)] = I/2 ( \cos [\omega t (1 - 1/m) - 2\pi/3] - \cos [\omega t (1 + 1/m)] )$ The current components of frequency corresponding to $\omega t(1 + 1/m)$ are cophasal. Thus, they will now appear in the line-current waveforms in a star-connected system; and no current will flow at this frequency in a balanced three-wire, three-phase load supplied with this modulated waveform. The current components of frequency corresponding to $\omega t(1 - 1/m)$ are spaced in the usual three-phase manner but in reversed sequence, compared with the original unmodulated currents. The effective operating supply frequency thus is $f(1 - 1/m)$.

Consider, next, the case when the phase angle between the supply and modulating waves is negative.

By similar reasoning, the phase currents in this case will be given by:

Phase A = $I/2(\cos[\omega t (1 - 1/m)] - \cos[\omega t (1 + 1/m)])$

Phase B = $I/2 (\cos[\omega t (1 - 1/m)] - \cos[\omega t (1 + 1/m) - 4\pi/3])$

Phase C = $I/2 (\cos[\omega t (1 - 1/m)] - \cos[\omega t (1 + 1/m) - 2\pi/3])$

In this case, the current components of frequency corresponding to $[\omega t(1/m)]$ are cophasal, and thus can be ignored. The components of frequency corresponding to $[\omega t(1 + 1/m]$ are, however, spaced in the usual three-phase manner, but again in reversed sequence; and the effective operating supply frequency thus is $f(1 + 1/m)$.

Other methods of speed control are known and it is useful to compare the present method of current amplitude modulation with certain known methods of speed control.

Unlike the known cyclo-convertor, the present method does not rely on the amplification of an input signal; it is essentially a power modulator. Further, although controlled rectifiers (rather than diodes) are used, commutation is "natural" and not "forced". The difficulties and costliness of "forced" commutation, involving the use of oscillators and banks of capacitors, are avoided. In general, previous methods for the speed control of alternating current motors, using thyristors, have used one form or other of "forced" commutation.

The modulating frequency ($f/m$), in the use of the present method, must be an integral sub-multiple of the supply frequency. Most of the possible resultant output frequencies are within 10 percent of the original frequency.

In Table I, which is provided at the end of this specification, there are tabulated the resultant (modulation) frequencies derived by modulating an alternating supply current of 50Hz. by one of a number of modulating waves of sub-multiple frequency, given by the value $50/m$ Hz.

It will be seen that $m$ can have only values of the form: $m = (3r + 1)$, where $r = 0, 1, 2$, and so on, for the same sequence of supply and modulation; and of the form: $m = (3r - 1)$, where $r = 1, 2, 3$, and so on, for opposed sequences of supply and modulation. This is the required condition for exactly correct spacing of the waves of time-modulation.

The present method of current amplitude modulation thus gives the possibility of small stepped speed-changes, whereas the method of pole-amplitude modulation, according to U.S. Pat. No. 3,233,159, gives larger steps. The two methods, though having much similarity in logic, correspond to completely different types of industrial application.

One circuit arrangement according to the present invention, for changing the speed of an induction motor having a three-phase stator winding, using the method of current amplitude modulation disclosed herein, employs a rectangular modulating wave, and comprises transformer means for providing a six-phase supply wave, that is carrier wave, at six terminals which are connected respectively by phase to the three-phase stator winding by way of pairs of controlled rectifiers, said rectifiers being controlled to permit current flow in one sense for a modulating wave positive half cycle and in the opposite sense for a negative half cycle.

Another circuit arrangement, for changing the speed of an induction motor having a delta-connected three-phase stator winding with phase-winding ends brought out to six terminals, has six pairs of controlled rectifiers connected in pairs from each phase-winding terminal, the one to the corresponding supply phase and the other to the supply phase next in arbitrary sequence, said rectifiers being controlled to permit current flow in one sense for a modulating wave positive half cycle and in the opposite sense for a negative half cycle.

Conveniently, such a speed changing circuit arrangement includes rectifier control means comprising three-phase carrier-wave, that is supply wave, zero crossing detecting means and corresponding pulse generating means, summing means for summing said pulses for all three phases, preset pulse counting means for counting a predetermined number of said pulses and for providing an output pulse identifying each said predetermined count, thereby to define a modulation frequency which is a predetermined sub-multiple of said carrier wave frequency, and logic means controlled both by said identifying output pulses and by said zero crossing pulses for providing inhibition control signals for said controlled rectifiers.

In order that the method of the present invention and circuit arrangements according to the invention may be readily put into practice, two circuit arrangements for current amplitude modulation of a three-phase supply and their manner of operation will now be described in detail with reference to the accompanying drawings, in which:

FIG. 3 shows a series of voltage waveforms which relate to the use of a modulating wave of 50/5 Hz, that is 10 Hz;

FIG. 4 is a composite pulse-time diagram showing the relationship between carrier-wave zero crossings and modulating-wave zero crossings;

FIG. 5 is a block schematic diagram of a trigger pulse generating circuit for controlling the gates of the thyristors shown in FIG. 1 or FIG. 2;

FIG. 7 is a circuit diagram of the preset counter shown in FIG. 5; and

FIG. 8 is a schematic diagram of the comparator and pulse direction logic unit shown in FIG. 5.

In order to provide a method which corresponds exactly to the equations given in the section headed Mathematical Theory, it is necessary to use sinusoidal modulation, by which the amplitude of the current waves for each phase of a three-phase supply is modulated according to a sinusoidal amplitude change with time. Such sinusoidal modulation can be used if it is so desired but it is unnecessarily complicated. A simpler method is preferred using rectangular modulation, which can be effected merely by switching the supply current "on" or "off", combined with reversal of polarity, that is current-flow direction, for successive "on" periods.

Rectangular modulation produces harmonics which do not occur with sinusoidal modulation. However, it is considered that time-harmonics are less serious than space-harmonics in relation to machine performance, and that some degree of time-harmonic distortion is tolerable, and justified by the simplification of apparatus thereby made possible.

It is, however, possible to vary the current amplitudes at different parts of each half-cycle of current modulation. As is common, a balance has to be struck between the simplicity of rectangular modulation giving some harmonic distortion, and the complexity of sinusoidal modulation, giving a pure sinusoidal output.

In practice, the easiest form of rectangular modulation is achieved by the use of bi-directional solid-state switches, and a six-phase supply. For each phase, positive and negative half-cycles of the modulating waveform correspond to in-phase and anti-phase voltages from the six-phase supply; and the effective modulating waveform is a square wave.

In order to be able to employ the resulting waveform to establish an effective rotating m.m.f. in a polyphase winding, it is necessary that one of the sidebands set up by the modulation process be suppressed. It has been shown earlier herein that this can be achieved by choosing correctly the phase displacement between the three modulating waveforms. If this is done, the suppressed sideband and its harmonics will appear cophasally at the three line points, and also at the machine star point with respect to the rectifier star point.

Figure 1:
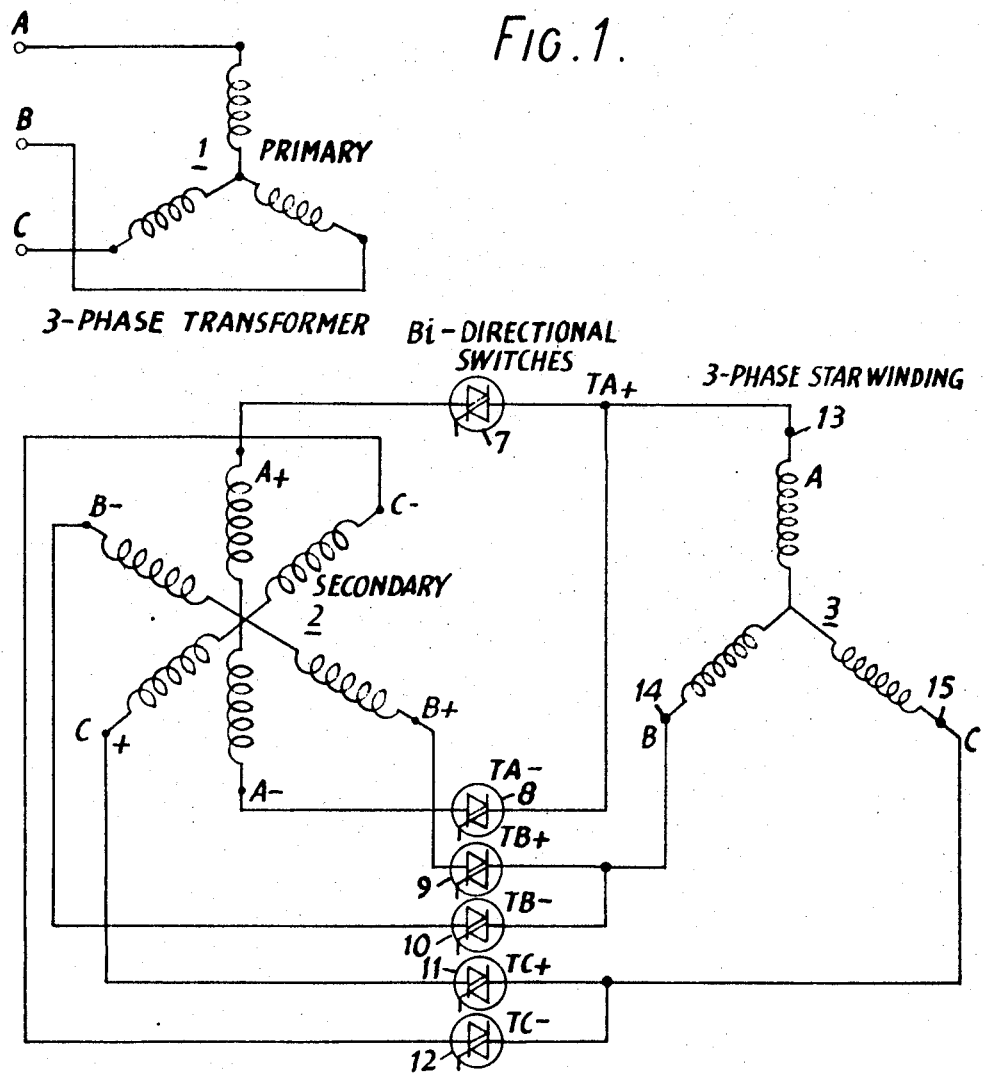
FIG. 1 shows a motor control circuit arrangement for current amplitude modulation of a three-phase alternating current supply to the star-connected stator winding of a three-phase induction motor supplied from a three-phase transformer.

The circuit arrangement of FIG. 1 include a three-phase transformer having its primary winding 1 connected to a three-phase supply A, B and C, and having a six-phase secondary, that is a three-phase, common center-tapped secondary, 2. The six output terminals, referenced A+, A−, B+, B−, C+ and C− according to their phase relationship, are respectively connected to three bi-directional switches, each comprising a pair of thyristors, referenced 7 to 12. These thyristors are connected in pairs 7–8; 9–10 and 11–12 to the ends 13, 14 and 15 of a star-connected stator winding 3 of a three-phase induction motor, having a squirrel-cage rotor shown at 4.

The six thyristors 7 to 12 are rendered conductive alternatively for each pair 7–8; 9–10 and 11–12 providing in effect, three bi-directional switches.

FIG. 3, which relates to a supply frequency of 50 Hz. and a modulating frequency of 10 Hz., shows at *a* the three angularly-displaced sine waves A, B and C of the 50 Hz. three-phase supply in solid, broken and chain lines, respectively. The corresponding three rectangular modulating waves are similarly shown at *b* and it will be noted that commutation is arranged for the three-phases at different instants of the absolute time scale. At *c* there are similarly shown the three voltage waveforms for the three phases with respect to the rectifier star point. At *d* there is shown the voltage waveform from rectifier star point to stator star point and at *e* there are shown the voltage waveforms for phases A, B and C with respect to the stator star point.

It is readily seen from FIG. 3 that only certain output frequencies can be obtained when natural commutation is employed; namely, those which arise when one half-cycle of one modulating wave corresponds to an integral number of half-cycles of the supply, and the time-displacement of the three modulating waves is equal to one-third of a modulating cycle.

The result of current amplitude modulation therefore, is to produce stepped frequency changes and therefore stepped speed-changes, and not continuous changes; but the steps are much smaller than can be produced by a change of pole-number.

Figure 2:
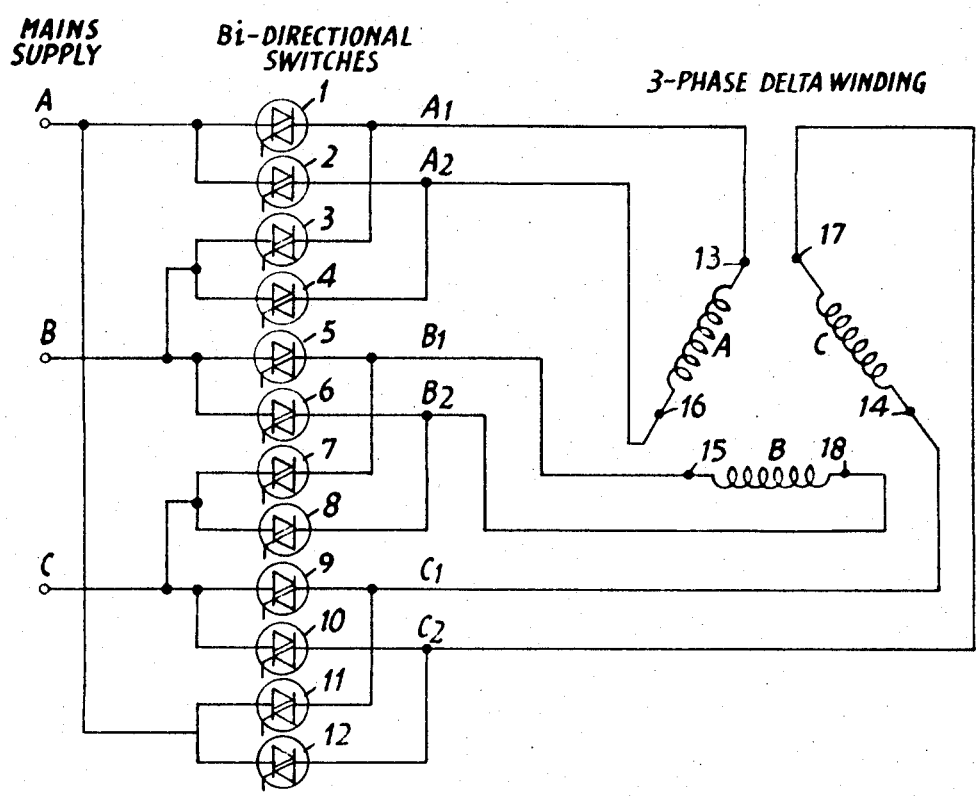
FIG. 2 shows a control circuit arrangement for current amplitude modulation of a three-phase alternating current supply to a three-phase induction motor having a delta-connected stator winding, not using a supply transformer.

The circuit arrangement of FIG. 2 is suitable for the supply of a delta-connected stator winding and avoids the use of the three phase supply transformer of FIG. 1 by the use of twelve thyristors 1 to 12.

For this arrangement, it is necessary that the six ends of the delta-connected phase-windings are brought out from the machine stator to points 13 to 18.

The diodes 1 to 12 are arranged as six pairs 1, 2; 3, 4; 5, 6; 7, 8; 9, 10; and 11, 12; the add-numbered diodes being connected to one winding end and the even-numbered diodes of each pair being connected to the opposite winding end.

Subject to the requirements stated above that the modulating frequency is a sub-harmonic of the supply, or carrier, frequency and the relative displacement of the three modulating waves for the three supply phases is one-third of a modulating cycle, the modulating wave may be generated or derived and varied in frequency in any convenient manner. However, a suitable practical motor control circuit arrangement which provides stepwise variation of speed over a range of speeds for a three-phase induction motor will now be described with reference to FIGS. 4 to 8 of the drawings.

FIG. 5 is a block diagram of the control circuit arrangement with related waveform or pulse diagrams below, showing the control signals generated by each circuit element.

In the figure, phase A supply terminal 20 is connected to the input of a three-phase zero-crossing detector 21. Detector 21 comprises a phase-splitter which derives phase A, B and C sine waves from the phase A input and provides positive-going output pulses at three output terminals A, B and C corresponding to the voltage zero-crossing of the corresponding phases.

The phase A, B and C pulses are summed by a summing amplifier 22 and fed to a preset counter 23, which provides an output pulse at the end of each predetermined count. In the pulse diagrams of FIG. 5, the preset count is "5".

The count pulses are fed to a "2" divider 24 having two output terminals 25 and 26 at which positive rectangular waves are generated defining the positive half cycles and the negative half cycles respectively of the modulation wave.

A comparator and pulse direction logic unit 27 has six input terminals to which are fed pulses identifying the phase A, B and C zero-crossings from the detector 21, the count pulses from the preset counter 23 and the modulation half-waves from divider 24. This unit has six output terminals arranged in pairs 28, 29; 30, 31; and 32, 33 corresponding respectively to phases A, B and C and providing positive-going pulses relating to positive modulation wave half-cycles and negative half-cycles respectively at the even-numbered and odd-numbered terminals, as shown by the related pulse diagram.

Each output signal from unit 27 is supplied as an inhibition signal to one terminal respectively of six trigger pulse amplifiers 36 to 41.

A trigger pulse generator 34 generates enabling pulses at terminal 35 which are supplied to the second input terminal of the amplifiers 36 to 41.

The outputs of amplifiers 36 to 41 are supplied respectively to control the gates of thyristors 7 to 12 of FIG. 1.

As the preset control of counter 23 is progressively set to a higher count, the modulation frequency is decreased and the operative modulation product frequency is decreased or increased respectively according to whether the supply sequence and modulating sequence are the same or opposed, as shown by Table I, and the motor speed is decreased or increased correspondingly.

A further explanatory pulse diagram showing the various operative pulses on a common time scale, for count values of M = 5 and M = 7, is shown in FIG. 4.

In that figure, the first three lines show the phase A, B and C zero-crossing pulses respectively, as at the output of detector 21 of FIG. 5. The next three lines define modulation wave zero-crossings for M=5 and with modulation sequence opposite to the supply sequence.

Reference to Table I will show that this condition corresponds to a modulation product frequency ratio (1 − 1/m), that is an operative frequency of 40 Hz.

The next three lines of FIG. 4 define modulation wave zero-crossings for M=7 and with modulation sequence the same as the supply sequence. Reference to Table I will show that this condition corresponds to a modulation product frequency ratio (1 + 1/m), that is an operative frequency of 57.2 Hz.

The next line of FIG. 4 shows the combined phase A, B and C zero-crossing pulses, as at the output of summing amplifier 22 of FIG. 5.

The final two lines of FIG. 4 show the combined modulating wave and supply voltage zero-crossings for the case M=5 and the case M=7, respectively.

Figure 6:
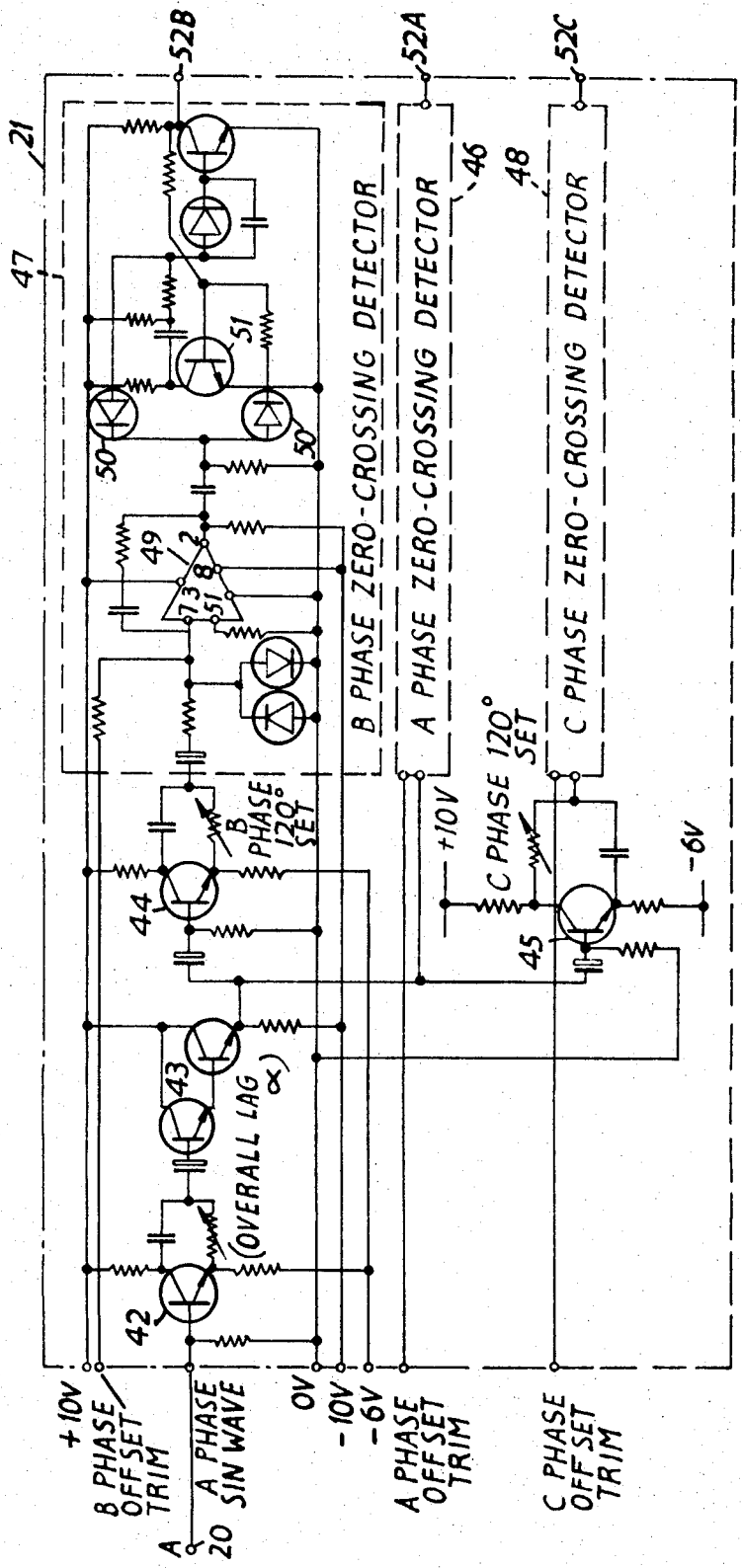
FIG. 6 is a schematic circuit diagram of the three-phase zero-crossing detector shown in FIG. 5.

FIG. 6 shows in detail the circuit arrangement of the three-phase zero-crossing detector 21 of FIG. 5. As shown, the detector 21 comprises a transistor unit 42 for sitting in a required overall phase lag, followed by phase A, B and C transistor phase-slitting circuits 43, 44 and 45, respectively.

Each circuit 43 to 45 is followed by similar differential amplifier and rectifier-differentiator units 46, 47 and 48, respectively, of which only unit 47, relating to phase B, is shown in detail in FIG. 6.

Each unit 46 to 48 comprises an integrated circuit high-gain differential amplifier 49, which produces rectangular waves whose zero-crossings correspond to those of the sine wave of the corresponding phase. The differential amplifier 49 is followed by a rectifier 50, transistor differentiator 51 circuit which provides a positive-going 20 μsec. pulse for each zero-crossing, at output terminal 52A, 52B and 52C, correspondingly for the three supply phases.

FIG. 7 shows in detail the summing amplifier 22 and preset counter 23 of FIG. 5. Thus, the summing amplifier is a three-input OR gate having input terminals 52A, 52B and 52C and output terminal 53.

The pulses at terminal 53 are fed to an input transistor 54 which is followed by four integrated circuit, T-type bistable, binary counters 55 to 58, each providing alternative "1" and "0" outputs at Q and $\bar{Q}$ terminals. These are selected alternatively by four switches 59 to 62, the presetting of which four switches provides a count up to "16", in this example. Thus, counter 23 is a conventional four-stage, ripple-through counter. The four outputs from switches 59 to 62 are supplied to an AND gate, not shown in the figure which gate also provides the single output pulse for each preset count and is also used TO reset the counter after each preset count.

FIG. 8 shows in detail the logic unit 27 of FIG. 5. Thus, the unit 27 of FIG. 8 is shown with the same six input terminals as in FIG. 5. The phase A, B and C zero-crossing pulses are supplied respectively to three AND gates 63, 64 and 65. The counter 23 output count-identifying pulses are supplied to all three AND gates 63, 64 and 65.

Two further groups of three AND gates 66 to 68 and 69 to 71 are respectively supplied with the output pulses appearing at terminal 25 and terminal 26 of divider 24 of FIG. 5.

The AND gate group 66 to 68 are further supplied with output pulses from AND gates 63 to 65, respectively, and AND gate group 69 to 71 are similarly supplied. The two AND gate groups 66 to 68 and 69 to 71, respectively, supply the Set and Reset inputs of corresponding bistables 72 to 74. The Q outputs of bistables 72 to 74 correspondingly supply anti-phase terminals 29, 31 and 33 and the $\bar{Q}$ outputs supply in-phase terminals 28, 30 and 32, which correspond to the similarly-numbered terminals in FIG. 5.

TABLE 1

RESULTANT FREQUENCIES FROM TIME-MODULATION OF 50 c/s SUPPLY

| If supply sequence and modulating sequence are the same | | | If supply sequence and modulating sequence are opposed | | |
|---|---|---|---|---|---|
| m | (1+1/m) | Resultant frequency (Hz) | m | (1−1/m) | Resultant frequency (Hz) |
| 1 | 2.0 | 100 | | | |
| 4 | 1.25 | 62.5 | 2 | 0.5 | 25 |
| 7 | 1.14 | 57.2 | 5 | 0.8 | 40 |
| 10 | 1.10 | 55 | 8 | 0.875 | 43.7 |
| 13 | 1.08 | 54 | 11 | 0.909 | 45.5 |
| 16 | 1.06 | 53.2 | 14 | 0.930 | 46.5 |
| 19 | 1.05 | 52.6 | 17 | 0.491 | 47.1 |
| 22 | 1.045 | 52.3 | 20 | 0.95 | 47.5 |
| 25 | 1.04 | 52 | 23 | 0.957 | 47.8 |
| 28 | 1.036 | 51.8 | 26 | 0.962 | 48.1 |
| 31 | 1.032 | 51.6 | 29 | 0.967 | 48.3 |
| | | | 32 | 0.969 | 48.4 |

We claim:

1. A method of speed-changing for a three-phase induction motor supplied from a three-phase alternating current supply comprising modulating the amplitude of the supply current in the three phases by three modulating waves of the same frequency, said frequency being an integral sub-multiple of the supply frequency and the three waves being relatively displaced from one another in time by one-third of the period of a complete cycle of the modulating waveform.

2. A method of speed-changing as claimed in claim 1, in which the three modulating waves are square waves having the relative amplitudes +1 and −1 only.

3. A method of speed-changing as claimed in claim 1, in which the supply phase sequence and the modulating sequence are the same.

4. A method of speed changing as claimed in claim 1, in which the supply phase sequence and the modulating sequence are opposed.

5. A method of speed changing as claimed in claim 1 in which the modulating frequency is progressively changed to provide stepwise speed change over a speed range.

6. A motor control circuit arrangement for changing the speed of an induction motor having a delta-connected three-phase stator winding with phase-winding ends brought out to six terminals, comprising six pairs of controlled rectifiers connected in pairs from each phase-winding terminal, the one to the corresponding supply phase and the other to the supply phase next in arbitrary sequence, and rectifier control means for controlling said rectifiers so as to permit current flow in one sense for a modulating wave positive half cycle and in the opposite sense for a negative half cycle.

7. A motor control circuit arrangement as claimed in claim 6, wherein said rectifier control means comprises three-phase carrier-wave; zero crossing detection means and corresponding pulse generating means, summing means for summing said pulses for all three phases preset pulse counting means for counting a predetermined number of said pulses and for providing an output pulse identifying each said predetermined count, thereby to define a modulation frequency which is a predetermined sub-multiple of said carrier wave frequency, and logic means controlled both by said identifying output pulses and by said zero crossing pulses for providing inhibition control signals for said controlled rectifiers.

8. A motor control circuit arrangement as claimed in claim 7, in which the three-phase zero-crossing detection means comprises a phase-splitter for deriving all three phase waves from a single phase input, high-gain differential amplifiers for providing corresponding rectangular waves and rectifier-differentiator circuits for identifying each zero-crossing.

9. A motor control circuit arrangement as claimed in claim 7, in which the preset counter comprises a plurality of bistable elements connected in sequence, each providing alternative Q an $\bar{Q}$ outputs and switch means for preselecting a total count.

10. A motor control circuit arrangement as claimed in claim 9, in which the preselected switched output is fed to an AND gate to provide a output pulse identifying each preset count.

11. A motor control circuit arrangement as claimed in claim 7, in which the logic means comprises first, second and third groups of three AND gates, the first group having phase A, B and C zero-crossing pulse inputs respectively and all receiving the preset counter output pulse as second input, the outputs of the first group being supplied to corresponding ones of both second and third groups and the second and third gate groups receiving a second input corresponding to the different alternate pulses from said preset counter.

12. A method of changing the running speed of a three-phase induction motor fed from a three-phase alternating current supply of a first frequency by supplying the motor with three-phase current of a second frequency, comprising the following steps:
deriving from the three-phase supply three control waves which are;
 1. of the same frequency as each other;
 2. equal in frequency to a selected integral submultiple of the said first frequency; and
 3. spaced apart in time equal to one-third of the period of one cycle of the control waveform;
providing three groups of switch devices, one group in each phase of the three-phase supply, arranged to permit current flow in one sense for one polarity of an applied control potential and in the opposite sense for the opposite polarity of the applied control potential;
applying the three said control waves to the three said groups of switch devices; and
supplying to the said induction motor the three-phase currents permitted to flow by the said three groups of switch devices.

13. A method of changing the running speed of a three-phase induction motor as claimed in claim 12, in which the three control waves are of rectangular waveform.

14. A method of changing the running speed of a three-phase induction motor as claimed in claim 12, in which the phase-sequence of the said three control waves is the same as the said three-phase supply.

15. A method of changing the running speed of a three-phase induction motor as claimed in claim 12, in which the phase-sequence of the said three control waves is opposite to that of the said three-phase supply.

16. A method of changing the running speed of a three-phase induction motor as claimed in claim 12, in which the speed is changed progressively and stepwise by selecting consecutive integral sub-multiples of said first frequency for the frequency of the said three control waves.

* * * * *